(12) United States Patent
Kobayashi et al.

(10) Patent No.: US 8,369,402 B2
(45) Date of Patent: Feb. 5, 2013

(54) APPARATUS AND METHOD FOR PREDICTION MODES SELECTION BASED ON IMAGE FORMATION

(75) Inventors: Satoru Kobayashi, Bunkyou-ku (JP); Jun Makino, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 1804 days.

(21) Appl. No.: 11/152,609

(22) Filed: Jun. 14, 2005

(65) Prior Publication Data

US 2005/0281337 A1  Dec. 22, 2005

(30) Foreign Application Priority Data

Jun. 17, 2004  (JP) ................................ 2004-179933
Feb. 2, 2005   (JP) ................................ 2005-026530

(51) Int. Cl.
*H04N 7/12* (2006.01)
*H04N 11/02* (2006.01)

(52) U.S. Cl. .............................. 375/240.12; 375/240.08
(58) Field of Classification Search ............. 375/240.12, 375/240.08
See application file for complete search history.

(56) References Cited

U.S. PATENT DOCUMENTS

| 7,646,437 | B1 * | 1/2010 | Dumitras et al. | 348/700 |
| 2003/0223645 | A1 | 12/2003 | Sun et al. | |
| 2004/0008772 | A1 * | 1/2004 | Kojima | 375/240.08 |
| 2004/0213348 | A1 * | 10/2004 | Kim et al. | 375/240.12 |
| 2006/0120456 | A1 | 6/2006 | Tasaka et al. | |

FOREIGN PATENT DOCUMENTS

| EP | 0865208 A2 | 9/1998 |
| JP | 11-008851 A | 1/1999 |
| JP | 2001-145011 A | 5/2001 |
| JP | 2004-56827 A | 2/2004 |
| JP | 2006-186972 A | 7/2006 |
| WO | WO-2004010707 A1 | 1/2004 |

OTHER PUBLICATIONS

Yong-Dong, Z., Feing, D., Shou-xun, L.,"Fast 4x4 Intra-Predicted Mode Selection for H.264", 2003 IEEE Int. Conf. Multimedia & Expo (ICME 2003), Baltimore, MD, USA, Jun, 2004.*
Pan F et al, "Fast Mode Decision for Intra Prediction", JVT of ISO/IEC MPEG & ITU-VCEG, Mar. 7, 2003, pp. 1-22.
Kim C et al, "Multistage Mode Decision for Intra Prediction in H.264 Codec", Proceedings of the Spie, Spie, Bellingham, VA, US, vol. 5308, No. 1, Jan. 20, 2004, pp. 355-363.
Bojun Meng et al, "Fast Intra-Prediction Mode Selection . . . ", 2003 IEEE Intl Conf. on Acoustics . . . , New York, NY: IEEE, US, vol. 1 of 6, Apr. 6, 2003, pp. III389-III392.
Jagmohan A et al, "Time-Efficient Learning Theoretic Algotithms for H. 264 Mode Selection", Image Processing, 2004. NJ, USA, IEEE, Oct. 24, 2004, pp. 749-752. Chun-Ling Yang et al, "A Fast H.264 Intra 1-25 Prediction Algorithm Using Microblock Properties", NJ, USA, IEEE, vol. 1, Oct. 24, 2004, pp. 461-464.
Zhang Yong-Dong et al, "Fast 4x4 Intra-prediction Mode Selection for H.264", NJ, USA, IEEE, vol. 2, Jun. 27, 2004, pp. 1151-1154.
Yu-Wen Huang, et al., Hardware Architecture Design for H.264/AVC Intra Frame Coder, ISCAS 2004, p. 269-272.

* cited by examiner

*Primary Examiner* — Jay Patel
*Assistant Examiner* — Richard Torrente
(74) *Attorney, Agent, or Firm* — Canon USA Inc. IP Division

(57) ABSTRACT

An image coding apparatus determines an image pattern of image data and, based on the determined image pattern, selects a prediction mode for generating predicted pixel values by predicting pixel values in a frame using pixel values in the same frame. Alternatively, based on photographing information concerning input image data, an image coding apparatus selects a prediction mode for generating predicted pixel values by predicting pixel values in a frame using pixel values in the same frame.

7 Claims, 18 Drawing Sheets

INPUT IMAGE     HADAMARD TRANSFORM COEFFICIENT (a)     (b)

VERTICAL

FIG.4B

HORIZONTAL

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

APPARATUS AND METHOD FOR PREDICTION MODES SELECTION BASED ON IMAGE FORMATION

BACKGROUND OF THE INVENTION

1. Field of the Invention

The present invention relates to a moving image coding apparatus, and more particularly to a technique for selecting an optimal intra prediction mode when the H.264 coding standard is used.

2. Description of the Related Art

Various coding standards, such as Motion-JPEG, MPEG-1 and MPEG-2, have been established as techniques for high-efficiency coding of moving images. Manufacturers have been developing and marketing image capture apparatuses, such as digital cameras, digital video cameras, DVD (digital versatile disk) players, etc., which are capable of storing moving images using these coding standards. Accordingly, users are allowed to easily play back moving images using these image capture apparatuses, DVD players, personal computers, or the like.

Digitized moving images carry large mounts of data. Therefore, various coding methods for moving images capable of performing more efficient high compression than the above coding standards, such as MPEG-1 or MPEG-2, have been continuously researched and developed. Recently, a new coding algorithm called H.264/MPEG-4 Part 10 AVC (hereinafter referred to as the H.264 standard) has been standardized by the ITU-T (International Telecommunication Union-Telecommunication Standardization Sector) and the ISO (International Organization for Standardization).

The H.264 standard requires a large computational complexity for coding and decoding as compared to the conventional coding standards, such as MPEG-1 and MPEG-2, but provides a higher coding efficiency. A system and process for computation processing using the H.264 standard are disclosed, for example, in Japanese Laid-Open Patent Application No. 2004-56827.

The H.264 standard includes a prediction method known as intra prediction for predicting pixel values within a given frame by using pixel values within the same frame. In this intra prediction, there are a plurality of intra prediction modes, which are selectively used. In this instance, an intra prediction mode suitable for an input image is selected to form coded data that has little deterioration even after being subjected to highly efficient compression.

As for the intra prediction, the H.264 standard provides nine intra prediction modes to improve the precision of prediction. An optimal intra prediction mode is generally selected from the nine intra prediction modes by tentatively executing all of the intra prediction modes for an input image and, based on a result of the tentative execution, finding an intra prediction mode capable of obtaining an optimal result.

The reason for employing such a selection method is described below with reference to FIG. 17. FIG. 17 is a diagram showing a frame, in which an outer quadrilateral denotes the entire picture and five inner quadrilaterals denote blocks to be subjected to intra prediction. Although blocks are actually set over the entire picture, only five representative blocks are illustrated for the sake of convenience of description. The arrows in FIG. 17 indicate the direction of prediction indicated by an intra prediction mode that has been determined to be optimal as a result of computation in each block. Thus, since various objects are present at the respective locations even within the same picture, different intra prediction modes may be determined to be optimal for the respective blocks, and more than one particular intra prediction mode may be selected. For such a reason, in performing intra prediction, the precision of prediction is obtained for all of the intra prediction modes in each block, and an intra prediction mode capable of performing optimal prediction is selected and designated in each block.

However, computation for all of the intra prediction modes in each block to select an optimal intra prediction mode from among them increases computational complexity in the H.264 coding process, thus resulting in an excessive increase in coding processing time or a wasteful consumption of electric power.

SUMMARY OF THE INVENTION

The present invention has been made in consideration of the above situation, and an aspect of the present invention is to facilitate selecting an optimal intra prediction mode for an input image.

Another aspect of the present invention is to facilitate selecting an optimal intra prediction mode for an input image by using information on photography concerning the input image.

A further aspect of the present invention is to implement effective coding by alleviating computation complexity in an image coding apparatus using the H.264 standard.

In one aspect of the present invention, an image coding apparatus includes an input unit configured to input image data, a division unit configured to generate blocks by dividing the image data input by the input unit into blocks each comprised of a plurality of pixels, a determination unit configured to determine an image pattern of image data in each block generated by the division unit, a selection unit configured to select one of a plurality of prediction modes based on the image pattern determined by the determination unit, and a processing unit configured to output predicted pixel values by performing processing for predicting pixel values in a picture using pixel values in the same picture according to the prediction mode selected by the selection unit.

In another aspect of the present invention, an image coding apparatus includes an input unit configured to input image data to be coded, an acquisition unit configured to acquire photographing information concerning the image data, a selection unit configured to select m prediction modes from among n prediction modes ($1 \leq m \leq n$) using the photographing information, and a processing unit configured to output predicted pixel values by performing processing for predicting pixel values in a picture using pixel values in the same picture according to the m prediction modes selected by the selection unit.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A, 4B and 4C are diagrams illustrating intra prediction modes.

FIG. 15 is a diagram illustrating pixels for use in intra prediction.

DETAILED DESCRIPTION OF THE EMBODIMENTS

Embodiments of the invention will be described in detail below with reference to the drawings.

First Embodiment

Figure 6:
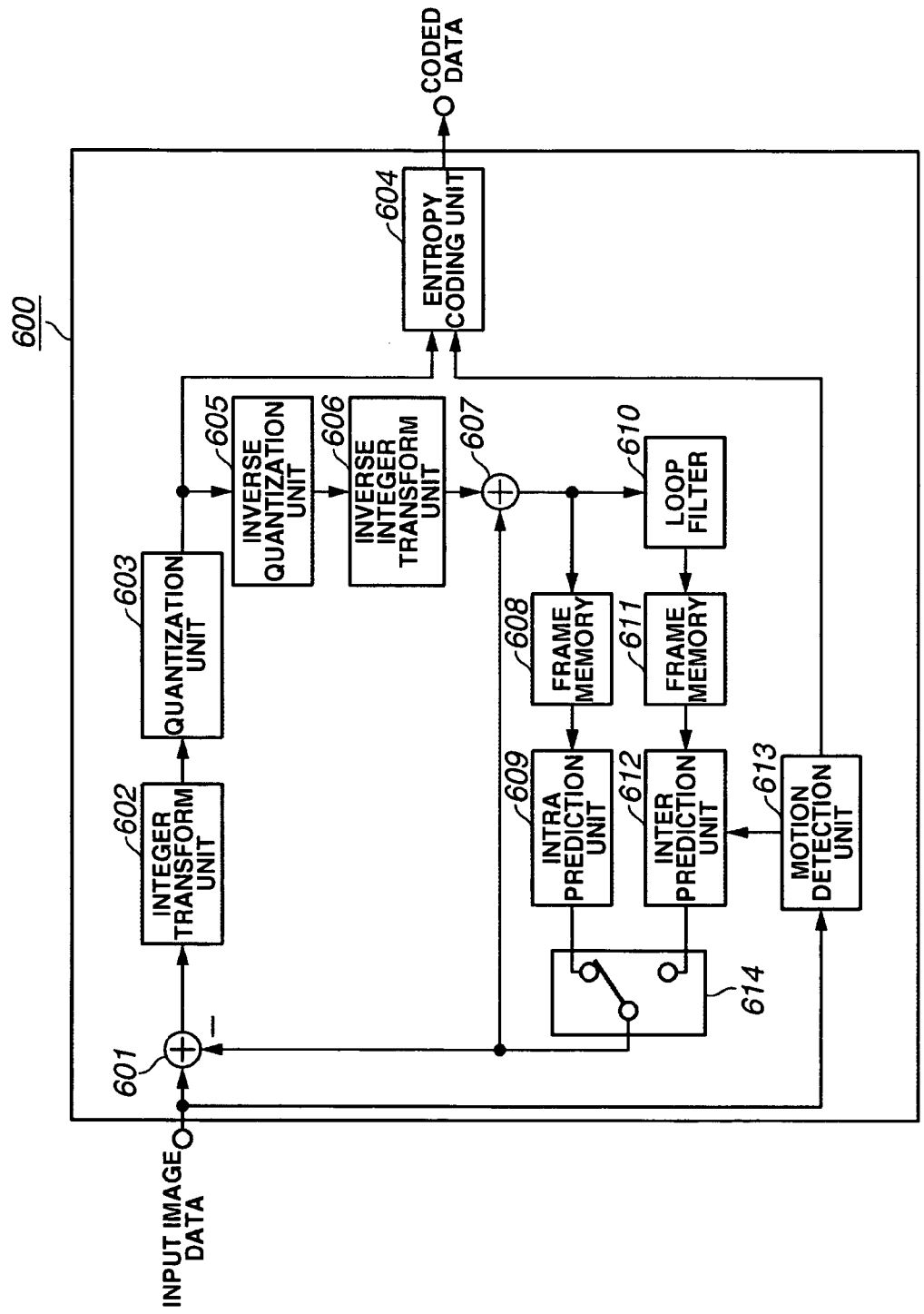
FIG. 6 is a block diagram of an image coding apparatus using the H.264 standard according to the first embodiment.

FIG. 6 is a block diagram showing the configuration of an image coding apparatus 600 according to a first embodiment of the invention. The image coding apparatus 600 includes a subtracter 601, an integer transform unit 602, a quantization unit 603, an entropy coding unit 604, an inverse quantization unit 605, an inverse integer transform unit 606, an adder 607, frame memories 608 and 611, an intra prediction unit 609, a loop filter 610, an inter prediction unit 612, a motion detection unit 613, and a switch 614. The image coding apparatus 600 is configured to perform processing for coding input image data to output the coded data.

The coding process in the image coding apparatus 600 shown in FIG. 6 is described next. The image coding apparatus 600 performs processing for coding according to the H.264 standard. Further, the image coding apparatus 600 divides input moving image data into blocks and performs processing for every block.

Initially, the subtracter 601 subtracts predicted image data from image data input to the image coding apparatus 600 (input image data) to output difference image data. Generation of the predicted image will be described later.

The integer transform unit 602 orthogonally transforms the difference image data output from the subtracter 601 to output transform coefficients. Then, the quantization unit 603 quantizes the transform coefficients using predetermined quantization parameters.

The entropy coding unit 604 receives and entropy-codes the transform coefficients quantized by the quantization unit 603 to output coded data.

The transform coefficients quantized by the quantization unit 603 are also used to generate predicted image data for coding subsequent blocks. The inverse quantization unit 605 performs inverse quantization on the transform coefficients quantized by the quantization unit 603. The inverse integer transform unit 606 performs inverse integer transform on the transform coefficients subjected to inverse quantization by the inverse quantization unit 605 to output decoded difference data. The adder 607 adds the decoded difference data and the predicted image data to output reconstructed image data.

The reconstructed image data is stored into the frame memory 608 and is also stored into the frame memory 611 via the loop filter 610. Data possible to refer to in the subsequent prediction among the reconstructed image data is stored for a short period in the frame memory 608 or 611. The loop filter 610 is used to remove blocking noise.

The intra prediction unit 609 performs intra-frame prediction using the reconstructed image data stored in the frame memory 608 so as to generate predicted image data. The inter prediction unit 612 performs inter-frame prediction based on motion vector information detected by the motion detection unit 613 and using the reconstructed image data stored in the frame memory 611 to generate predicted image data. The motion detection unit 613 detects motion vector information in the input image data and outputs the detected motion vector information to the inter prediction unit 612 and the entropy coding unit 604.

The switch 614 functions as a selection unit for selecting any one of intra prediction and inter prediction for every macroblock. That is, the switch 614 selects one of the output from the intra prediction unit 609 and the output from the inter prediction unit 612 and outputs the selected predicted image data to the subtracter 601 and the adder 607.

Figure 1:
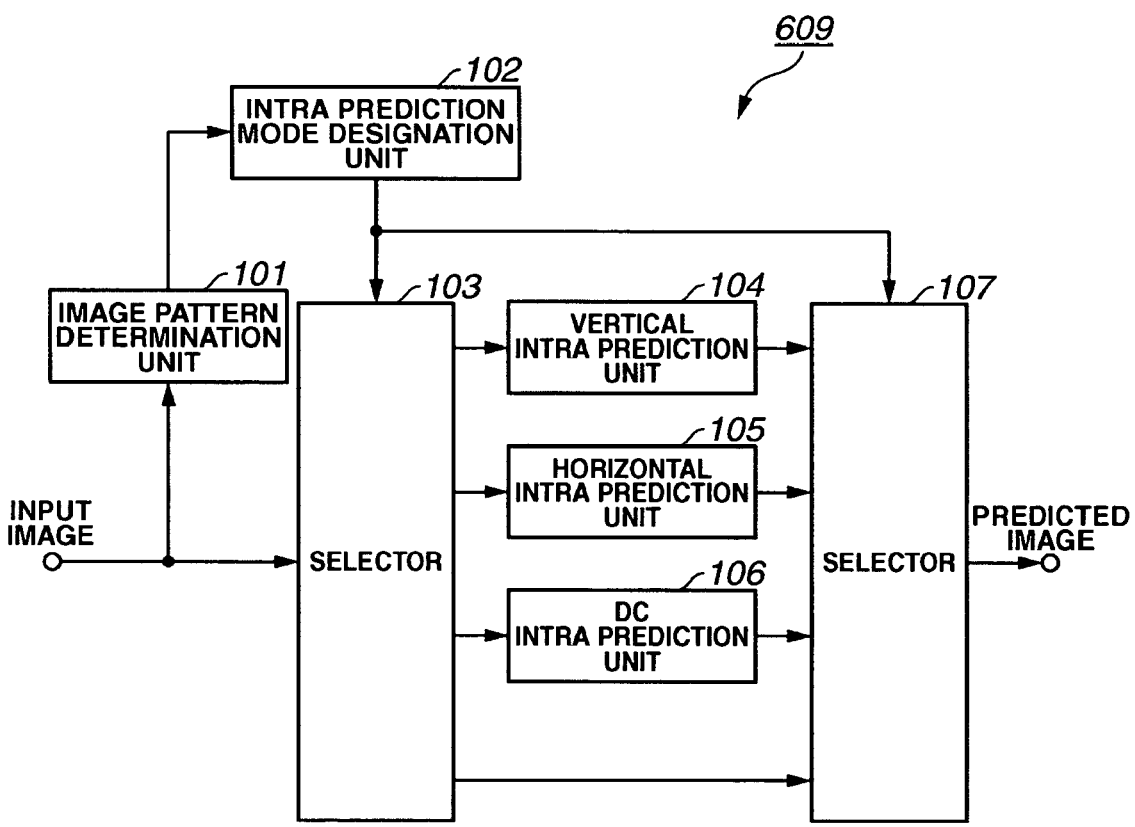
FIG. 1 is a block diagram illustrating processing for intra prediction according to a first embodiment of the invention.

FIG. 1 is a block diagram illustrating processing for intra prediction according to the first embodiment. The configuration shown in FIG. 1 corresponds to the intra prediction unit 609 included in the image coding apparatus 600.

Referring to FIG. 1, the intra prediction unit 609 includes an image pattern determination unit 101, an intra prediction mode designation unit 102, a selector 103, a vertical intra prediction unit 104, a horizontal intra prediction unit 105, a DC intra prediction unit 106, and a selector 107. The image pattern determination unit 101 determines an image pattern by performing Hadamard transform on an input image. The intra prediction mode designation unit 102 designates an optimal intra prediction mode from among a plurality of intra prediction modes based on the image pattern determined by the image pattern determination unit 101. The selectors 103 and 107 select one of the vertical intra prediction unit 104, the horizontal intra prediction unit 105 and the DC intra prediction unit 106, corresponding to the intra prediction mode designated by the intra prediction mode designation unit 102. The vertical intra prediction unit 104 performs intra prediction using a vertical intra prediction mode. The horizontal intra prediction unit 105 performs intra prediction using a horizontal intra prediction mode. The DC intra prediction unit 106 performs intra prediction using a DC intra prediction mode. Thus, one of the vertical, the horizontal and the DC intra prediction mode is selected and executed according to the selection by the selectors 103 and 107. As a result, the intra prediction unit 609 outputs a predicted image.

The essential portions of the intra prediction unit 609 shown in FIG. 1 are described next in detail. In the present embodiment, for example, the image pattern determination unit 101 performs Hadamard transform on an input image that is divided into 4×4 pixel blocks. However, the block size and the configuration for determining an image pattern are not limited to those described herein.

The image pattern determination unit 101 divides pixel data of an input image into 4×4 pixel blocks, performs Hadamard transform on pixel data for each block, and determines an image pattern for each block based on Hadamard transform coefficients obtained by the Hadamard transform computation.

Figure 2:
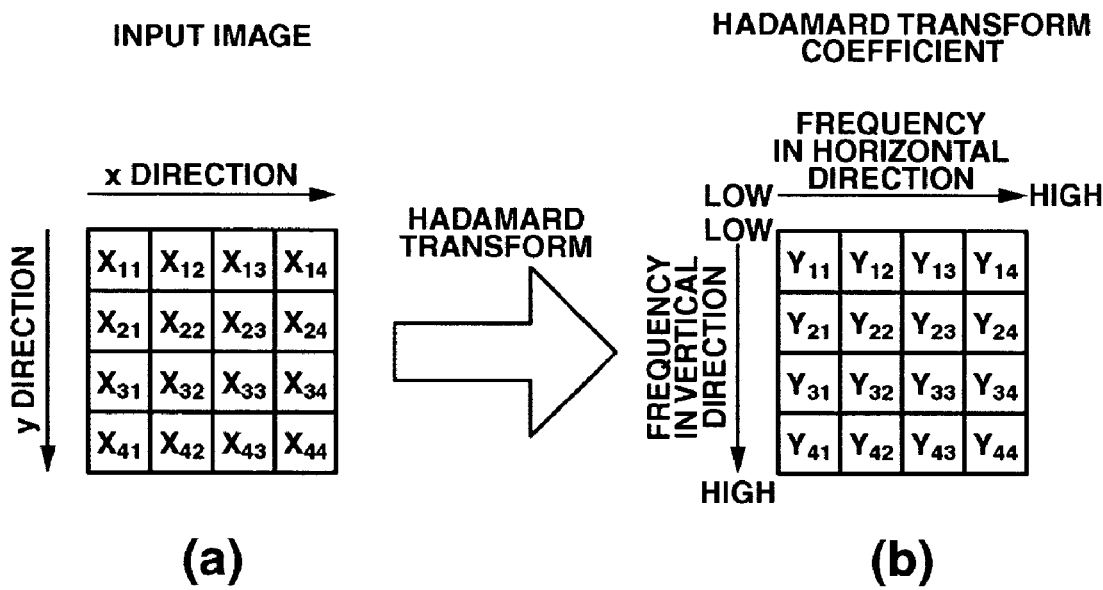
FIG. 2 is a diagram illustrating Hadamard transform.

Hadamard transform is described next with reference to FIG. 2. Hadamard transform is one type of orthogonal transform. FIG. 2 illustrates the manner of 4×4 Hadamard transform in the image pattern determination unit 101. In FIG. 2, part (a) illustrates an input image composed of 4×4 pixels, and part (b) illustrates Hadamard transform coefficients obtained by Hadamard transform. Let $H_4$ be the Hadamard transform matrix, X be input image signals, and Y be signals for the Hadamard transform coefficients. Then, the Hadamard transform is represented by the following equation:

$$[Y]=[H_4][X][H_4] \quad (1)$$

Here, let $$H_4 = \frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix} \quad (2)$$

$$X = \begin{bmatrix} X_{11} & X_{12} & X_{13} & X_{14} \\ X_{21} & X_{22} & X_{23} & X_{24} \\ X_{31} & X_{32} & X_{33} & X_{34} \\ X_{41} & X_{42} & X_{43} & X_{44} \end{bmatrix} \quad (3)$$

$$Y = \begin{bmatrix} Y_{11} & Y_{12} & Y_{13} & Y_{14} \\ Y_{21} & Y_{22} & Y_{23} & Y_{24} \\ Y_{31} & Y_{32} & Y_{33} & Y_{34} \\ Y_{41} & Y_{42} & Y_{43} & Y_{44} \end{bmatrix} \quad (4)$$

Thus, the Hadamard transform is defined as follows:

$$\begin{bmatrix} Y_{11} & Y_{12} & Y_{13} & Y_{14} \\ Y_{21} & Y_{22} & Y_{23} & Y_{24} \\ Y_{31} & Y_{32} & Y_{33} & Y_{34} \\ Y_{41} & Y_{42} & Y_{43} & Y_{44} \end{bmatrix} = \quad (5)$$

$$\frac{1}{4}\begin{bmatrix} 1 & 1 & 1 & 1 \\ 1 & 1 & -1 & -1 \\ 1 & -1 & -1 & 1 \\ 1 & -1 & 1 & -1 \end{bmatrix}\begin{bmatrix} X_{11} & X_{12} & X_{13} & X_{14} \\ X_{21} & X_{22} & X_{23} & X_{24} \\ X_{31} & X_{32} & X_{33} & X_{34} \\ X_{41} & X_{42} & X_{43} & X_{44} \end{bmatrix}\begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

Thus, the Hadamard transform can be performed with only one division, addition and subtraction. It should be noted that $Y_{11}$ on the left side of the equation (5) indicates a DC component of the input image, and $Y_{12}$ to $Y_{44}$ indicate Hadamard transform coefficients representing AC components of the input image.

Figure 3A:
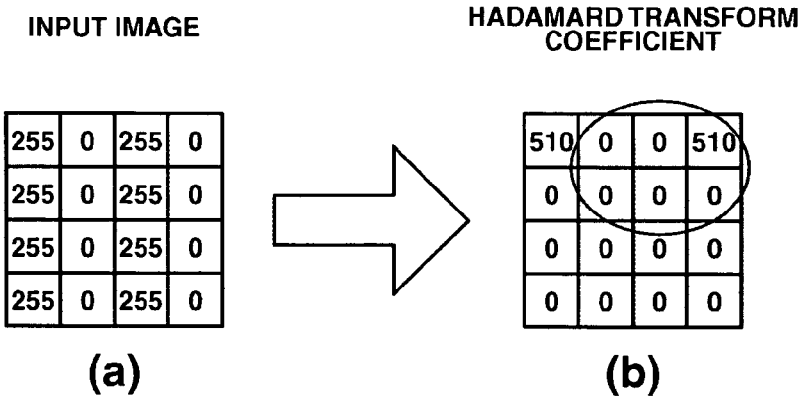
FIGS. 3A, 3B and 3C are diagrams illustrating examples of transform in Hadamard transform.
Figure 3B:
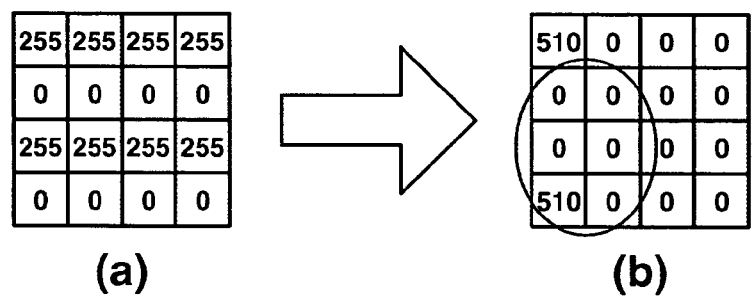
Figure 3C:
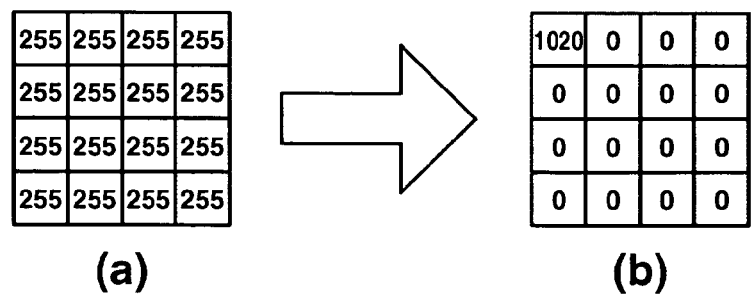

FIGS. 3A, 3B and 3C illustrate examples of the Hadamard transform for an input image in which image data of 8 bits per pixel (256 gradation levels) is divided into 4×4 pixel blocks. In each of FIGS. 3A, 3B and 3C, part (a) indicates an input image, and part (b) indicates Hadamard transform coefficients. In cases where a vertical edge exists in the input image block as shown in part (a) of FIG. 3A, an Hadamard transform coefficient corresponding to the position of the Hadamard transform coefficient $Y_{14}$ shown in part (b) of FIG. 2 takes a large value as shown in part (b) of FIG. 3A. In cases where a horizontal edge exists in the input image block as shown in part (a) of FIG. 3B, an Hadamard transform coefficient corresponding to the position of the Hadamard transform coefficient $Y_{41}$ shown in part (b) of FIG. 2 takes a large value as shown in part (b) of FIG. 3B. In cases where the input image block contains a flat image as shown in part (a) of FIG. 3C, an Hadamard transform coefficient corresponding to the position of the Hadamard transform coefficient $Y_{11}$ shown in part (b) of FIG. 2 takes a large value as shown in part (b) of FIG. 3C, and the other coefficients take a value of 0. In general, in cases where a vertical edge exists in the input image block, only an Hadamard transform coefficient indicating that the spatial frequency in the vertical direction is low takes a large value, as shown with Hadamard transform coefficients encircled by an ellipse in part (b) of FIG. 3A. In cases where a horizontal edge exists in the input image block, only an Hadamard transform coefficient indicating that the spatial frequency in the horizontal direction is low takes a large value, as shown with Hadamard transform coefficients encircled by an ellipse in part (b) of FIG. 3B. In cases where the input image block contains a flat image, Hadamard transform coefficients indicative of AC components of the input image take a small value.

Using the above-described method enables an image pattern of the input image, such as a vertical edge, a horizontal edge or flatness, to be determined based on Hadamard transform coefficients obtained by performing Hadamard transform on the input image.

Figures 4A, 4B, 4C:
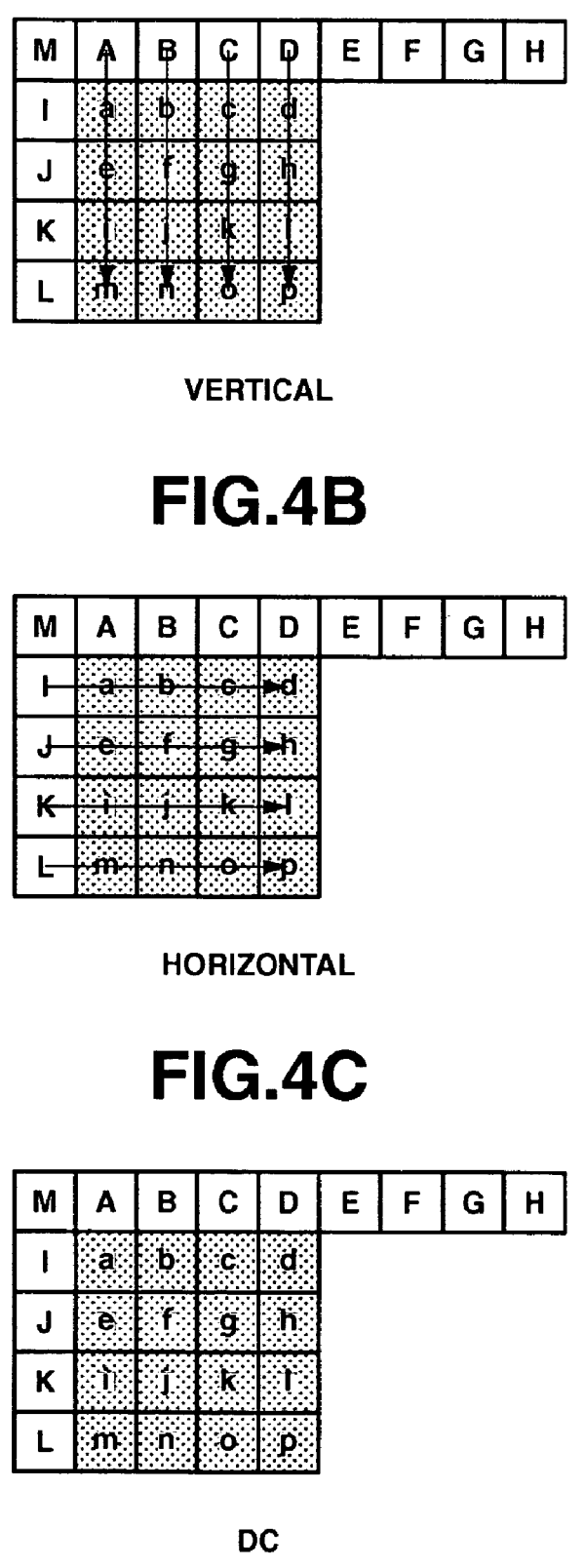

The intra prediction is described next with reference to FIGS. 4A, 4B and 4C. FIGS. 4A, 4B and 4C illustrate examples of the respective intra prediction modes.

In FIGS. 4A, 4B and 4C, a to p represent pixel values of an input image block to be predicted. A to M represent pixel values belonging to the adjacent blocks. The pixel values a to p and A to M are located in the same frame. The intra prediction generates predicted pixel values a' to p' using the pixel values A to M. The predicted pixel values a' to p' are lumped together to form a predicted image.

The various intra prediction modes are described next in detail.

In the vertical intra prediction mode shown in FIG. 4A, prediction is performed in the vertical direction. The predicted pixel values a' to p' are generated by predicting that the pixel values a, e, i and m each equal the pixel value A, the pixel values b, f, j and n each equal the pixel value B, the pixel values c, g, k and o each equal the pixel value C, and the pixel values d, h, l and p each equal the pixel value D. Thus, the following pixel values are generated:

a'=e'=i'=m'=A
b'=f'=j'=n'=B
c'=g'=k'=o'=C
d'=h'=l'=p'=D

In the horizontal intra prediction mode shown in FIG. 4B, prediction is performed in the horizontal direction. The predicted pixel values a' to p' are generated by predicting that the pixel values a, b, c and d each equal the pixel value I, the pixel values e, f, g and h each equal the pixel value J, the pixel values i, j, k and l each equal the pixel value K, and the pixel values m, n, o and p each equal the pixel value L. Thus, the following pixel values are generated:

a'=b'=c'=d'=I
e'=f'=g'=h'=J
i'=j'=k'=l'=K
m'=n'=o'=p'=L

In the DC intra prediction mode shown in FIG. 4C, prediction is performed such that all of the pixels have the same value. The predicted pixel values a' to p' are generated by predicting that all of the pixel values a to p are equal. Thus, the following pixel values are generated:

a'=b'=c'=d'=e'=f'=g'=h'=i'=j'=k'=l'=m'=n'=o'=p'

The smaller the difference between the predicted pixel value and the actual pixel value of an input image, the higher the precision of prediction becomes, thus enabling efficient image compression.

The method for designating an intra prediction mode according to an image pattern is described next.

The intra prediction mode designation unit 102 designates an optimal intra prediction mode, from among the above-described intra prediction modes, based on an image pattern determined by the image pattern determination unit 101 as described above. For example, if it is determined that the input image block contains a vertical edge, the intra prediction mode designation unit 102 designates the vertical intra prediction mode. If it is determined that the input image block contains a horizontal edge, the intra prediction mode designation unit 102 designates the horizontal intra prediction mode. If it is determined that the input image block contains a flat image, the intra prediction mode designation unit 102 designates the DC intra prediction mode.

More specifically, in cases where a vertical edge exists in the input image block as shown in FIG. 3A, pixel values having the following relationship are obtained:

a=e=i=m
b=f=j=n
c=g=k=o
c=h=l=p

This input image block is subjected to Hadamard transform to obtain Hadamard transform coefficients. If the image pattern determination unit 101 determines that the input image block has an image pattern containing a vertical edge, the intra prediction mode designation unit 102 designates the vertical intra prediction mode, in which the precision of prediction is highest for the input image block.

In cases where a horizontal edge exists in the input image block as shown in FIG. 3B, pixel values having the following relationship are obtained:

a=b=c=d
e=f=g=h
i=j=k=l
m=n=o=p

This input image block is subjected to Hadamard transform to obtain Hadamard transform coefficients. If the image pattern determination unit 101 determines that the input image block has an image pattern containing a horizontal edge, the intra prediction mode designation unit 102 designates the horizontal intra prediction mode, in which the precision of prediction is highest for the input image block.

In cases where the input image block contains a flat image as shown in FIG. 3C, pixel values having the following relationship are obtained:

a=b=c=d=e=f=g=h=i=j=k=l=m=n=o=p

This input image block is subjected to Hadamard transform to obtain Hadamard transform coefficients. If the image pattern determination unit 101 determines that the input image block has an image pattern containing a flat image, the intra prediction mode designation unit 102 designates the DC intra prediction mode, in which the precision of prediction is highest for the input image block.

Then, the selectors 103 and 107 select one of the intra prediction units 104 to 106 corresponding to the intra prediction mode designated by the intra prediction mode designation unit 102, thus causing the selected prediction unit to perform intra prediction processing on the input image. As a result, predicted pixel values can be generated according to an optimal intra prediction mode. In addition, in cases where the image pattern determination unit 101 cannot certainly determine an image pattern of the input image and the intra prediction mode designation unit 102 cannot designate an optimal intra prediction mode, or in cases where none of the intra prediction units 104 to 107 is selected by the selectors 103 and 107 for any other reason, the intra prediction unit 609 outputs the input image as it stands.

If the time required for Hadamard transform in determining an image pattern is taken into consideration, a timing adjustment unit, such as a memory, for providing a predetermined delay time may be added to the stage before the selector 103, or the intra prediction unit itself may perform timing adjustment, so that an image determined for an image pattern can be matched in timing with an image to be subjected to intra prediction processing.

Figure 5:
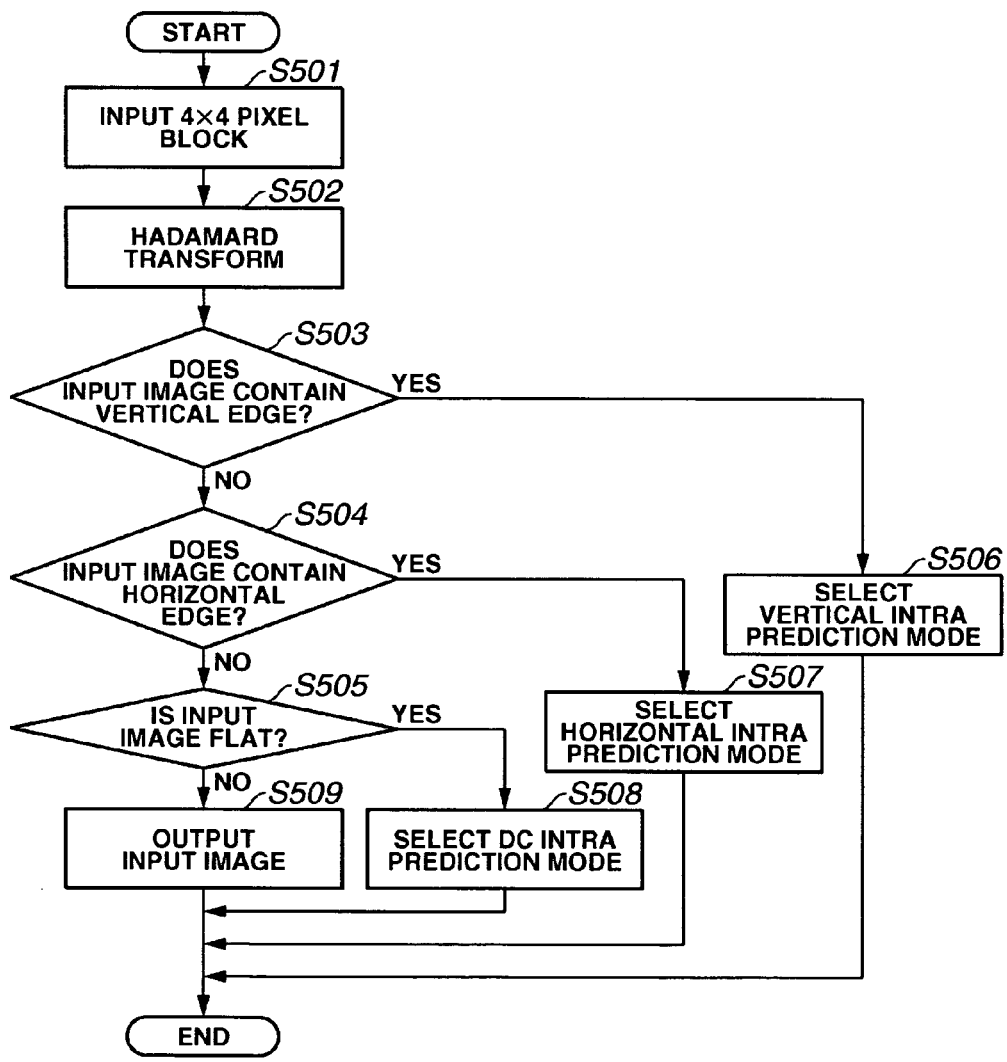
FIG. 5 is a flow chart illustrating processing for selecting an intra prediction mode according to the first embodiment.

The processing sequence for selecting an intra prediction mode according to the first embodiment is described below with reference to the block diagram of FIG. 1 and the flow chart of FIG. 5. The flow chart of FIG. 5 illustrates a flow of processing corresponding to a control program that a controller (not shown) executes to control each unit shown in FIG. 1.

Initially, the image pattern determination unit 101 divides the input image into 4×4 pixel blocks and inputs each block (step S501). The image pattern determination unit 101 then performs Hadamard transform (step S502) to determine an image pattern as described below.

The image pattern determination unit 101 determines whether the input 4×4 pixel block contains a vertical edge (step S503), a horizontal edge (step S504) or a flat image (step S505).

If it is determined by the image pattern determination unit 101 that the block contains a vertical edge ("yes" at step S503), the intra prediction mode designation unit 102 designates the vertical intra prediction mode from among the plurality of intra prediction modes, and the selectors 103 and 107 select the vertical intra prediction unit 104 (step S506).

If it is determined by the image pattern determination unit 101 that the block contains a horizontal edge ("no" at step S503 and "yes" at step S504), the intra prediction mode designation unit 102 designates the horizontal intra prediction mode from among the plurality of intra prediction modes, and the selectors 103 and 107 select the horizontal intra prediction unit 105 (step S507).

If it is determined by the image pattern determination unit 101 that the block contains a flat image ("no" at step S503, "no" at step S504 and "yes" at step S505), the intra prediction mode designation unit 102 designates the DC intra prediction mode from among the plurality of intra prediction modes, and the selectors 103 and 107 select the DC intra prediction unit 106 (step S508).

In cases where the block has none of the above image patterns, that is, in case where the image pattern determination unit 101 cannot determine any image pattern ("no" at steps S503, S504 and S505), the selectors 103 and 107 select none of the intra prediction units 104 to 107 and cause the input image to be output as it is (step S509). Then, the flow of processing comes to an end.

In addition, in cases where the image pattern determination unit 101 cannot determine any image pattern, the selectors 103 and 107 may be configured to independently select the intra prediction unit 104, 105 or 106.

In the above-described first embodiment, the vertical intra prediction mode, the horizontal intra prediction mode and the DC intra prediction mode are employed as intra prediction modes to be selected. However, intra prediction modes other than the above-described intra prediction modes can also be employed in the same manner.

In addition, in the above-described first embodiment, a determination is made for a vertical edge, a horizontal edge or a flat image. However, a combination of these patterns may be determined to select an intra prediction mode corresponding thereto.

Furthermore, in the above-described first embodiment, a determination is made for one of a vertical edge, a horizontal edge and a flat image. However, a determination may be made in such a way as to narrow down the intra prediction modes to be selected. For example, it is determined that the input image block does not contain any horizontal edge (that is, there is a possibility that the input image block contains a vertical edge or a flat image). Even in this configuration, an optimal intra prediction mode can be efficiently selected and a computational cost in the image coding apparatus 600 can be reduced.

Moreover, in the above-described first embodiment, the image pattern determination unit (Hadamard transform unit) 101 and the intra prediction mode designation unit 102 are included in the intra prediction unit 609 in the image coding apparatus 600. However, the image pattern determination unit (Hadamard transform unit) 101 or the intra prediction mode designation unit 102 may be disposed, for example, outside the image coding apparatus 600 or outside the intra prediction unit 609. For example, the image pattern determination unit 101 or the intra prediction mode designation unit 102 may directly receive input image data to be supplied to the image coding apparatus 600 shown in FIG. 6 so as to determine an image pattern or to designate an intra prediction mode in the same manner as described above.

Second Embodiment

A second embodiment of the invention relates to an example of modification of the image pattern determination unit 101 described in the first embodiment shown in FIG. 1. In the second embodiment, the image pattern determination unit 101 is configured to determine an image pattern using a method for applying filtering to an input image, instead of using the Hadamard transform method. The construction and operation of parts other than the image pattern determination unit 101 are the same as those described in the first embodiment and are, therefore, omitted from description here.

The image pattern determination unit (filtering unit) 101 in the second embodiment determines an image pattern, such as an edge, by applying a difference filter to an input image of each block and evaluating the magnitude of an edge intensity value obtained. As the difference filter for use in the image pattern determination unit 101, for example, an operator is used. The operator is a matrix having weight values stored thereon. However, filtering is not limited to this configuration.

An edge detection method using the operator is described next.

In the edge detection method using the operator, respective weights are added to pixel values of a target pixel and a neighboring pixel in an input image. Then, the weighted pixel values of the target pixel and the neighboring pixel are added together to form an edge intensity value of the target pixel. Setting appropriate weight values and evaluating the magnitude of the edge intensity value enable an image pattern, such as a vertical edge, a horizontal edge or a flat image, in an image block to be determined.

As an image pattern is determined with the configuration and operation of the image pattern determination unit 101 as described above, an optimal intra prediction mode for the image pattern can be selected at a low computational cost in the same manner as described in the first embodiment.

Third Embodiment

Figure 14:
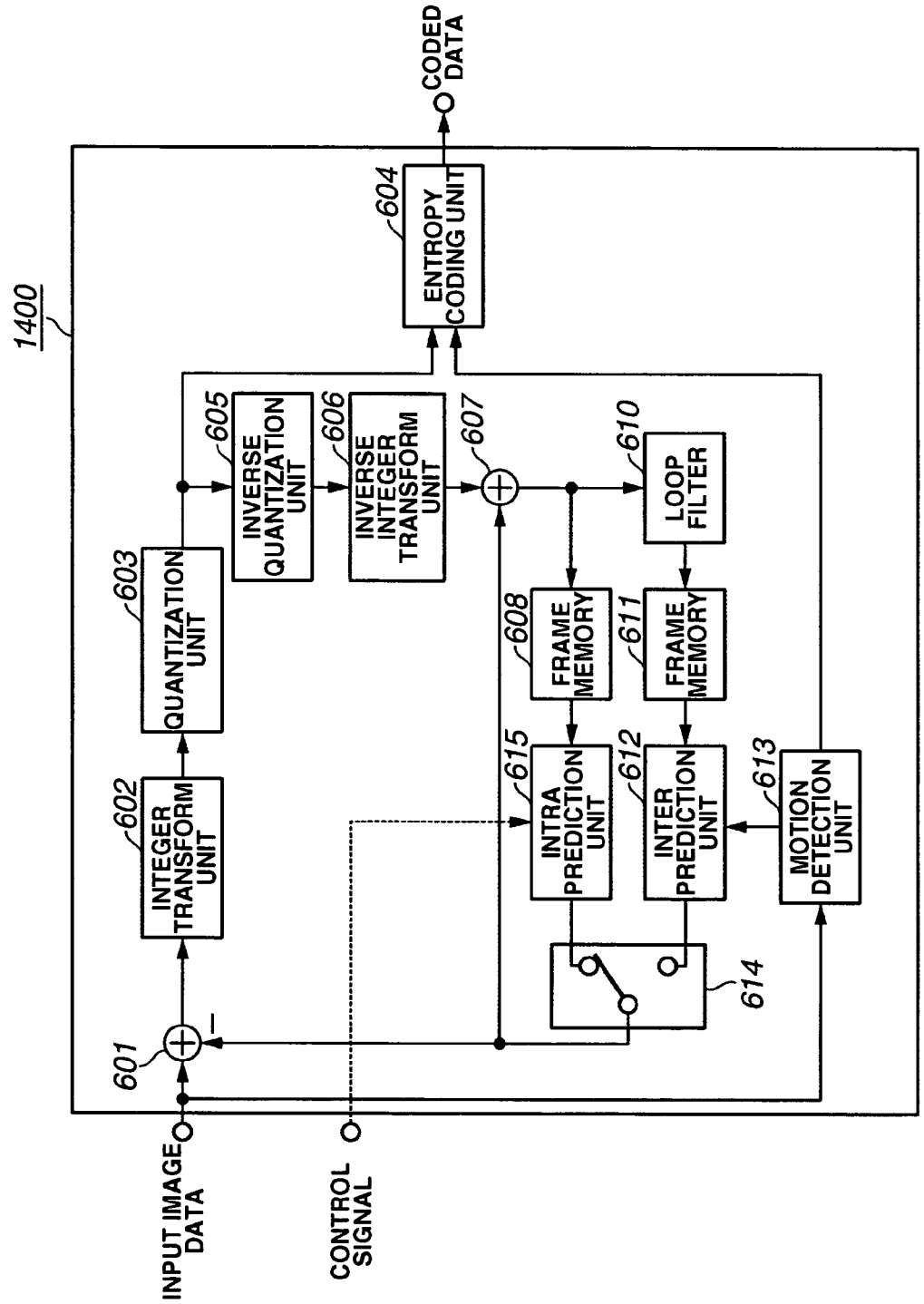
FIG. 14 is a block diagram of the image coding apparatus according to the third embodiment.

FIG. 14 is a block diagram showing the configuration of an image coding apparatus 1400 according to a third embodiment of the invention. The image coding apparatus 1400 includes a subtracter 601, an integer transform unit 602, a quantization unit 603, an entropy coding unit 604, an inverse quantization unit 605, an inverse integer transform unit 606, an adder 607, frame memories 608 and 611, a loop filter 610, an inter prediction unit 612, a motion detection unit 613, a switch 614, and an intra prediction unit 615. The image coding apparatus 1400 is configured to perform processing for coding input image data to output the coded data.

The coding process in the image coding apparatus 1400 shown in FIG. 14 is described below. The image coding apparatus 1400 performs processing for coding according to the H.264 standard. Further, the image coding apparatus 1400 divides input image data into blocks and performs processing for every block.

In the block diagram of FIG. 14, the units having the same reference numerals (601 to 608, 610 to 614) as those in the block diagram of FIG. 6 have the same functions and operations as those described with reference to FIG. 6. In the following discussion, in order to avoid a duplicate description about the units described in FIG. 6, only points different from those described in FIG. 6 are described.

Responsive to a control signal supplied from the outside of the image coding apparatus 1400, the intra prediction unit 615, which is unique in the third embodiment, performs intra-frame prediction using the reconstructed image data stored in the frame memory 608 so as to generate predicted image data. The switch 614 functions as a selection unit for selecting any one of intra prediction and inter prediction for every macroblock. That is, the switch 614 selects one of the output from the intra prediction unit 615 and the output from the inter prediction unit 612 and outputs the selected predicted image data to the subtracter 601 and the adder 607.

Figure 15:
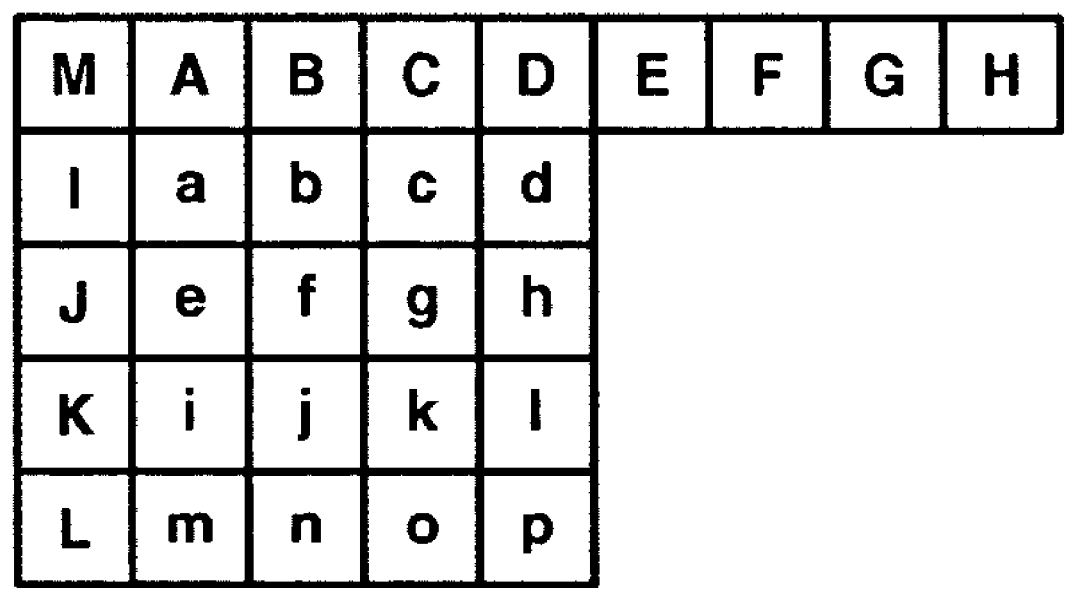

The intra prediction performed by the intra prediction unit 615 is supplementarily described below with reference to FIGS. 15 and 16.

In the intra prediction, values of adjacent pixels that have previously been coded are used as prediction values. In cases where a target block for coding is of the 4×4 pixel size (pixels a to p) as shown in FIG. 15, prediction is performed using pixel values of pixels A to M surrounding the target block. In this instance, the direction of prediction is designated and only the necessary pixel values are used for prediction. Since there are provided nine intra prediction modes having the respective different directions of prediction and the respective different contents, an optimal intra prediction mode is selected for prediction.

Figure 16:
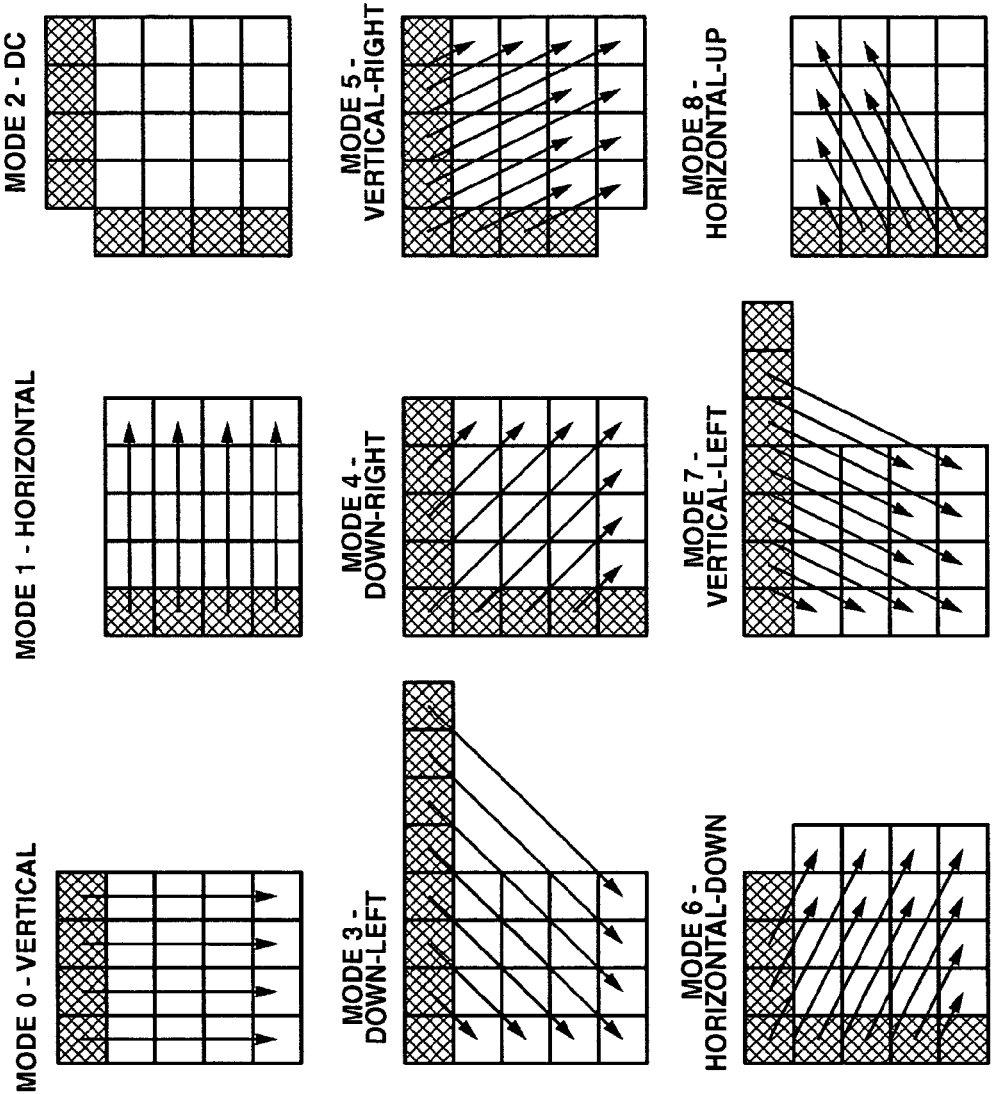
FIG. 16 is a diagram illustrating nine intra prediction modes.

FIG. 16 shows the various directions of prediction for use in the respective intra prediction modes. For example, in the case of the vertical intra prediction mode (Mode 0), values of the pixels adjacent to the target block in the vertical direction (corresponding to the pixels A, B, C and D shown in FIG. 15) are used as prediction values, and it is predicted that these pixel values continue in the vertical direction. Accordingly, it is predicted that each of values of the pixels a, e, i and m shown in FIG. 15 equals the value of the pixel A. Similarly, it is predicted that each of values of the pixels b, f, j and n equals the value of the pixel B. The similar prediction is also applied to the subsequent pixels. After the above prediction, difference values of the respective pixels, such as a-A, e-A, i-A and m-A, are obtained and, then, integer transform, quantization, etc., are applied to the obtained values.

In addition to the vertical intra prediction mode (Mode 0), eight intra prediction modes (Mode 1 to Mode 8) are provided as shown in FIG. 16. The DC intra prediction mode (Mode 2) is a prediction mode using a mean value of upper and left-hand pixel values. The details of each intra prediction mode are disclosed in the H.264-related standards, etc., and, therefore, a further description is omitted herein. In the H.264 standard, since there are a total of nine intra prediction modes as described above, an optimal intra prediction mode can be selected for a target pixel block to be coded. Accordingly, the precision of prediction can be improved and the value of difference image data can be made small.

Figure 18:
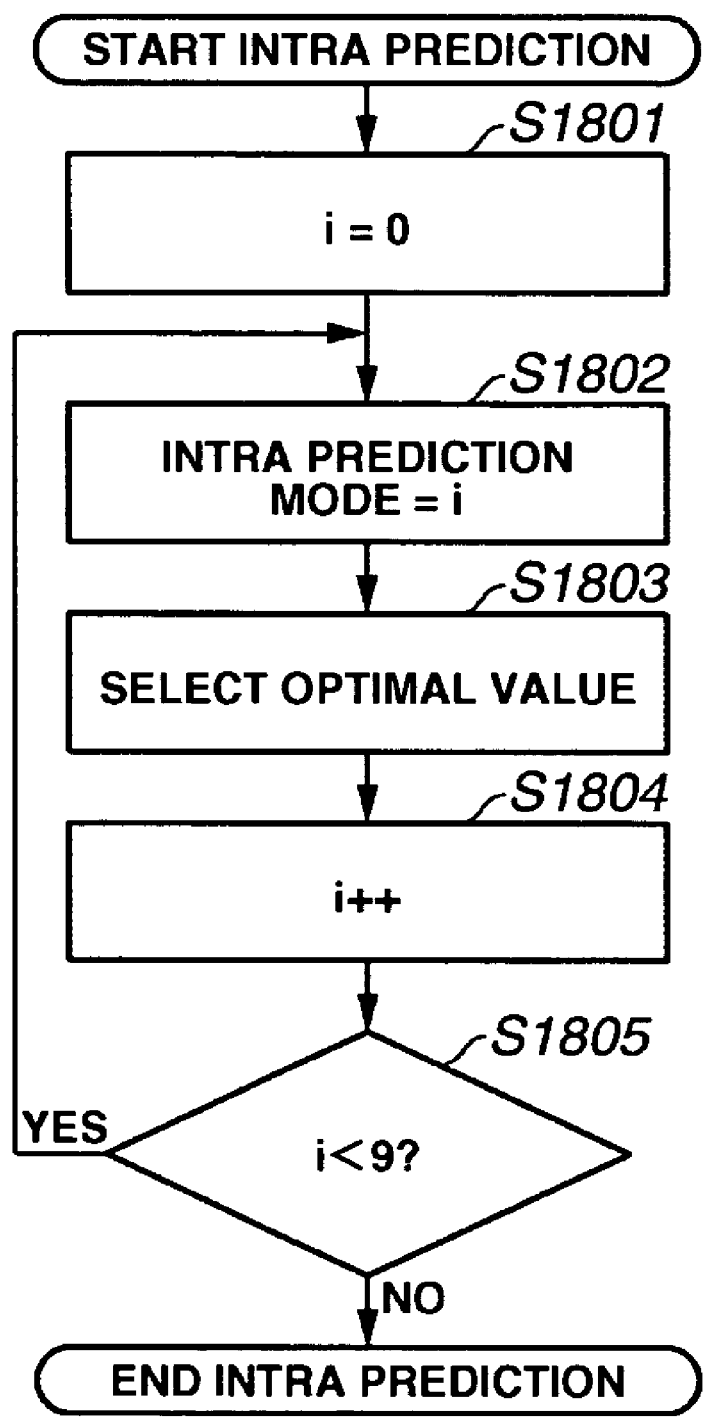
FIG. 18 is a flow chart illustrating ordinary processing for selecting an intra prediction mode.

In addition, the ordinary process for selecting an optimal intra prediction mode in the intra prediction unit 615 is performed in the sequence shown in the flow chart of FIG. 18. Referring to FIG. 18, when the intra prediction for a target block is started, a counter i indicative of an intra prediction mode is provided and the counter i is set to "0" (step S1801). Then, the intra prediction is performed using the intra prediction mode indicated by the value of the counter i (step S1802). The precision of the intra prediction is evaluated, and an intra prediction mode indicating an optimal value of the precision of prediction is selected as compared to the other intra prediction modes that have previously been evaluated (step S1803). Then, the counter i is incremented (step S1804). The sequence from step S1802 to step S1804 is repeated until the counter i reaches "9" which is the number of intra prediction modes (step S1805). As a result, all of the nine intra prediction modes are executed for each target block to be coded. Accordingly, an optimal intra prediction mode can be selected.

In addition, responsive to a supplied control signal, the intra prediction unit 615 can also perform a process for selecting an optimal intra prediction mode in the sequence different from the above-described ordinary selection process. This different selection process is described later.

The configuration of an image capture apparatus 700 containing the above-described image coding apparatus 1400 is described next together with the further operation of the intra prediction unit 615 associated with the operation of the image capture apparatus 700.

Figure 7:
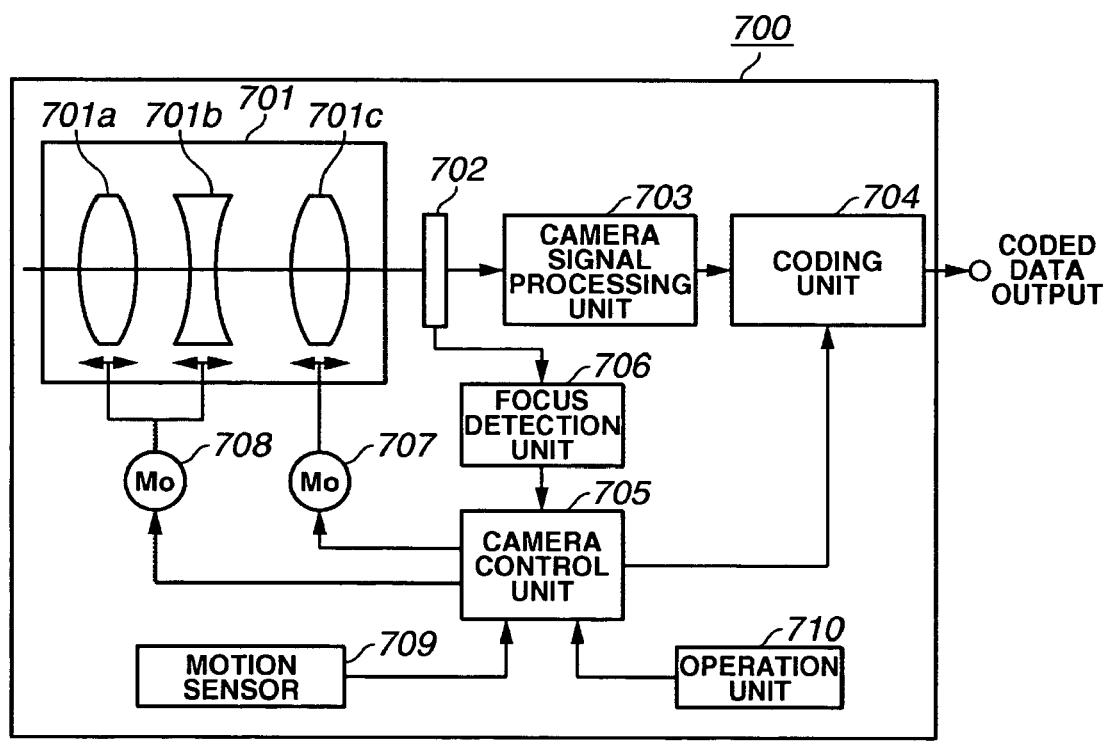
FIG. 7 is a block diagram showing the configuration of an image capture apparatus according to a third embodiment of the invention.

FIG. 7 is a block diagram showing the configuration of the image capture apparatus 700 according to the third embodiment. The image capture apparatus 700 includes a photographic lens unit 701, an image sensor 702, a camera signal processing unit 703, a coding unit 704, a camera control unit 705, a focus detection unit 706, a focusing motor 707, a zooming motor 708, a motion sensor 709, and an operation unit 710. The photographic lens unit 701 is composed of a plurality of lens groups including zooming lenses 701a and 701b and a focusing lens 701c. The image sensor 702 is a CCD (charge-coupled device) sensor, a CMOS (complementary metal-oxide semiconductor) sensor, or the like. The operation unit 710 is operable for the various functions. The image capture apparatus 700 converts an optical image formed by the photographic lens unit 701 into an image signal and performs compression coding on the image signal according to the H.264 standard so as to output coded data. In the image capture apparatus 700, the coding unit 704 corresponds to the above-described image coding apparatus 1400. Thus, the image capture apparatus 700 contains the image coding apparatus 1400 as an H.264 encoder for video compression.

The photographing process performed by the image capture apparatus 700 shown in FIG. 7 is described next. When a photographing operation is started, an optical image formed by the photographic lens unit 701 is converted into an electrical signal by the image sensor 702. In this instance, the focusing lens 701c can be moved by the focusing motor 707 to perform focus adjustment, and the zooming lenses 701a and 701b can be moved by the zooming motor 708 to perform optical zoom adjustment. In addition, an optical image stabilizing mechanism (not shown) or an electronic image stabilizing function (not shown) can be operated according to motion information provided by the motion sensor 709 to correct for motion of the image (e.g., to correct for camera shake).

The electrical signal generated by the image sensor 702 is supplied as a moving image signal to the camera signal processing unit 703. The camera signal processing unit 703 performs luminance signal processing, color signal processing, etc., on the moving image signal to generate moving image data. The moving image data output from the camera signal processing unit 703 is supplied to the coding unit 704. The coding unit 704 codes the moving image data to output coded data. In the coding unit 704, such a coding process as that described above with reference to FIG. 14 is performed. The coded data is of a format that can be recorded on a recording medium, such as a disk, by a recording unit (not shown).

The camera control unit 705 controls the operation of each unit of the image capture apparatus 700. If an instruction is given by the user via the operation unit 710, the camera control unit 705 controls each unit in accordance with the instruction.

In addition, during automatic focusing, the focus detection unit 706 detects a focusing state based on the electrical signal generated by the image sensor 702 and transmits information on the detected focusing state (focusing information) to the camera control unit 705. The camera control unit 705 sends a control signal to the focusing motor 707 according to the focusing information to perform focus adjustment for obtaining an optimal focusing state. During manual focusing, the camera control unit 705 sends a control signal to the focusing motor 707 according to an instruction supplied from the operation unit 710 to perform focus adjustment for obtaining a desired focusing state.

Furthermore, the camera control unit 705 sends a control signal to the zooming motor 708 according to an instruction supplied from the operation unit 710 to perform zoom control for obtaining a desired zoom position.

The motion sensor 709 includes an acceleration sensor or the like and can detect the movement of the image capture apparatus 700 in addition to detection of motion for camera shake correction. More specifically, the motion sensor 709 detects a photographing action, such as panning or tilting, and transmits information on the photographing action to the camera control unit 705.

When panning or tilting is detected by the motion sensor 709, the camera control unit 705 performs a control operation as described below.

Figure 8:
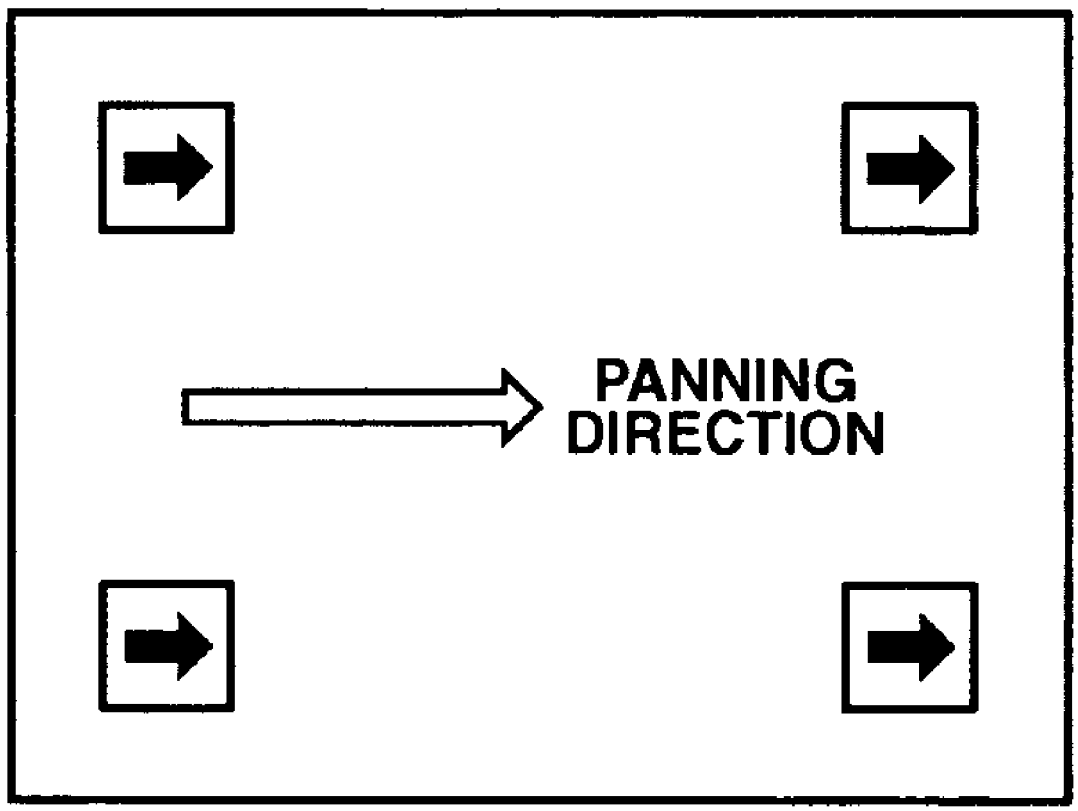
FIG. 8 is a diagram showing an example of directions of intra prediction for an image obtained during panning.

FIG. 8 illustrates the condition of a captured image obtained when the panning action is performed during the photographing operation. In cases where a picture is panned in the direction of a white (not filled) arrow as shown in FIG. 8, the captured image appears as flowing in whole in the direction of the white arrow (horizontal direction). Therefore, if intra prediction is performed on the captured image by the coding unit 704, it can be estimated that the horizontal direction is an optimal prediction direction. In this case, it can also be estimated that, as shown in FIG. 8, the directions of intra prediction for the respective blocks are aligned in a regular direction corresponding to the direction of panning, while, in the case of an image shown in FIG. 17, the directions of intra prediction for the respective blocks on the picture are irregular. Therefore, selecting the intra prediction for the horizontal direction (horizontal intra prediction mode (Mode 1)) results in an optimal or approximately optimal intra prediction mode being efficiently selected. In the case of tilting in the vertical direction, the vertical intra prediction mode (Mode 0) should be selected in a similar way. In addition, if panning or tilting is performed in an oblique direction, one of the diagonal intra prediction modes should be selected in consideration of such an oblique component.

Thus, the camera control unit 705 sends a control signal to the intra prediction unit 615 included in the coding unit 704 (i.e., the image coding apparatus 1400) for selecting an intra prediction mode according to the photographing action, such as panning or tilting. In addition, responsive to the supplied control signal, the intra prediction unit 615 performs the following processing instead of the above-described ordinary process for selecting an optimal intra prediction mode. That is, the intra prediction unit 615 uniquely selects one intra prediction mode according to the direction of panning or tilting, or selects an optimal intra prediction mode after narrowing down nine intra prediction modes to two or three intra prediction modes according to the direction of panning or tilting. By doing this, an optimal intra prediction mode can be far more efficiently selected than a case where all of the intra prediction modes are tentatively executed to select an intra prediction mode.

Figure 9:
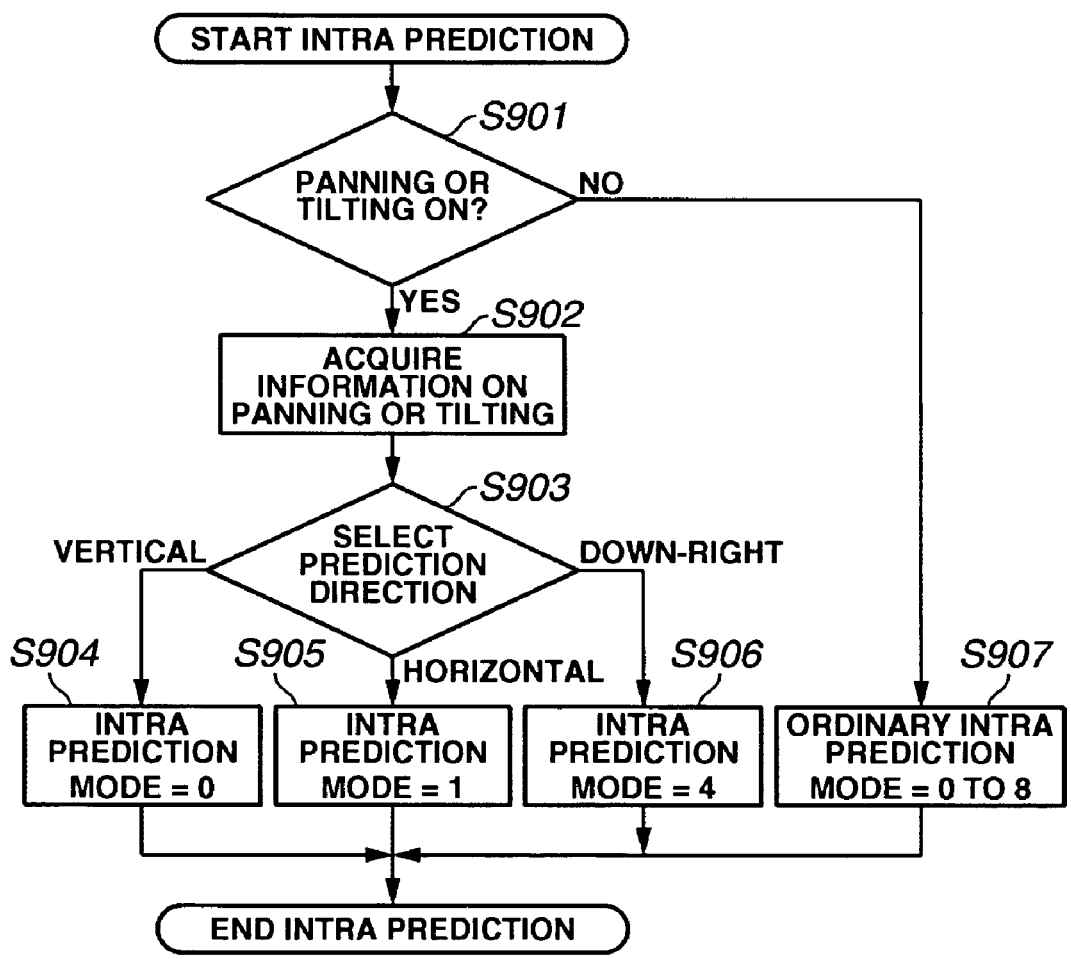
FIG. 9 is a flow chart illustrating processing for selecting an intra prediction mode according to the direction of panning or tilting in an image coding apparatus according to the third embodiment.

FIG. 9 is a flow chart illustrating the operation sequence of the intra prediction unit 615 for selecting an intra prediction mode according to the direction of panning or tilting as described above.

If no panning or tilting action is detected by the motion sensor 709 (no in step S901), the intra prediction unit 615 performs the ordinary process for selecting an optimal intra prediction mode as shown in FIG. 18 and performs intra prediction using the selected intra prediction mode (step S907). On the other hand, if a panning or tilting action is detected by the motion sensor 709 with respect to an image to be subjected to intra prediction (yes in step S901), the intra prediction unit 615 acquires from the camera control unit 705 information on the direction or speed of the detected panning or tilting action (step S902).

On the basis of the information acquired at step S902 on the direction or speed of panning or tilting, the intra prediction unit 615 automatically selects a prediction direction approximately corresponding to the direction of panning or tilting (step S903). If the vertical direction is selected at step S903, the intra prediction unit 615 performs intra prediction using the vertical intra prediction mode (Mode 0) (step S904). If the horizontal direction is selected at step S903, the intra prediction unit 615 performs intra prediction using the horizontal intra prediction mode (Model) (step S905). If the diagonal down-right direction is selected at step S903, the intra prediction unit 615 performs intra prediction using the down-right intra prediction mode (Mode 4) (step S906).

With regard to prediction in the diagonal direction, the precision of detection of the motion sensor 709 may be improved to enable the other diagonal intra prediction modes (Mode 3, 5, 6, 7, 8) to be also selected. By doing so, the precision of prediction can be more improved.

In addition, in the case of the sequence shown in FIG. 9, when panning or tilting is performed, the intra prediction unit 615 uniquely selects an intra prediction mode according to the direction of panning or tilting. However, the intra prediction unit 615 may be configured to reduce options of intra prediction modes by narrowing down nine intra prediction modes to two or three intra prediction modes according to the direction or speed of panning or tilting or by excluding intra prediction modes that are determined to be clearly inappropriate in prediction directions, and, after that, to obtain an optimal intra prediction mode via computation from among the remaining options.

According to the third embodiment as described above, information on the photographing action, such as panning or tilting, is used for selecting an intra prediction mode. Accordingly, an optimal intra prediction mode can be easily selected and a processing load on coding can also be reduced.

Fourth Embodiment

A fourth embodiment of the invention is described below with reference to FIGS. 10 and 11.

In the fourth embodiment, when the image capture apparatus 700 described in the third embodiment performs a zooming action, the camera control unit 705 and the intra prediction unit 615 operate as follows.

When the zooming action for either zoom-in or zoom-out is performed during a photographing operation, a captured image obtained during zooming appears as flowing in the radial direction from the center of a picture. Therefore, when intra prediction is performed on the captured image by the coding unit 704, it should be taken into consideration in which direction a target block to be coded is located with respect to the center of the picture. If intra prediction corresponding to that direction is performed, the efficiency of prediction can be improved.

Figure 10:
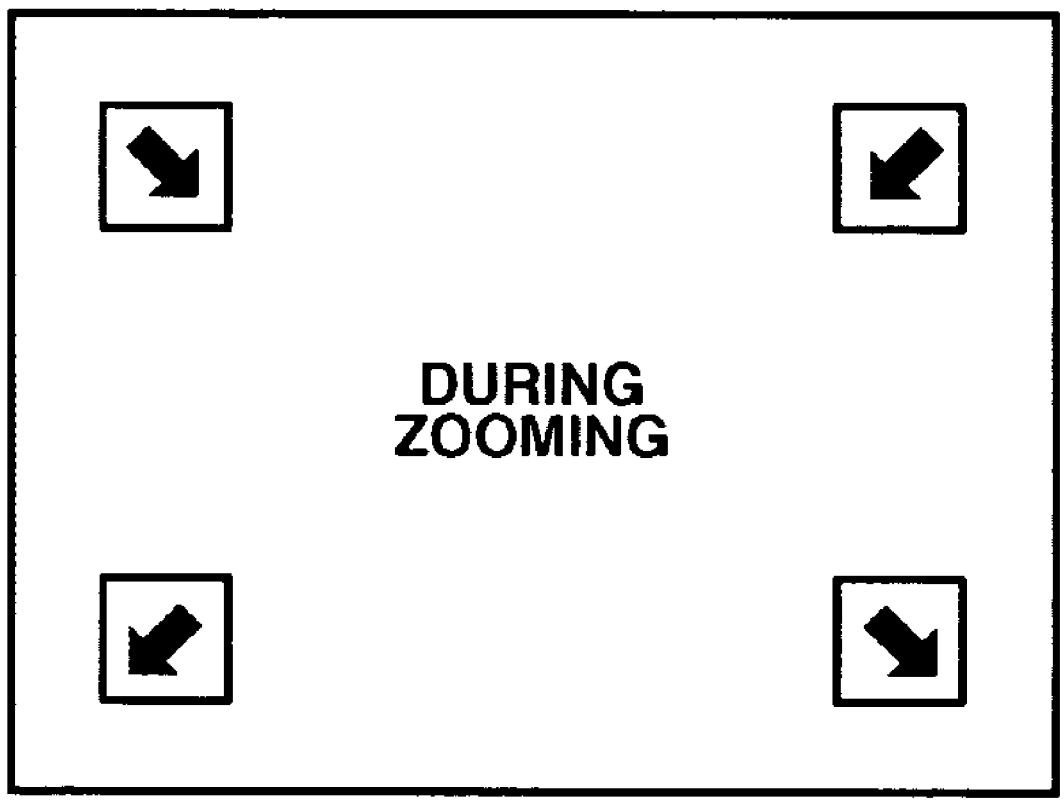
FIG. 10 is a diagram showing an example of directions of intra prediction for an image obtained during zooming.
Figure 17:
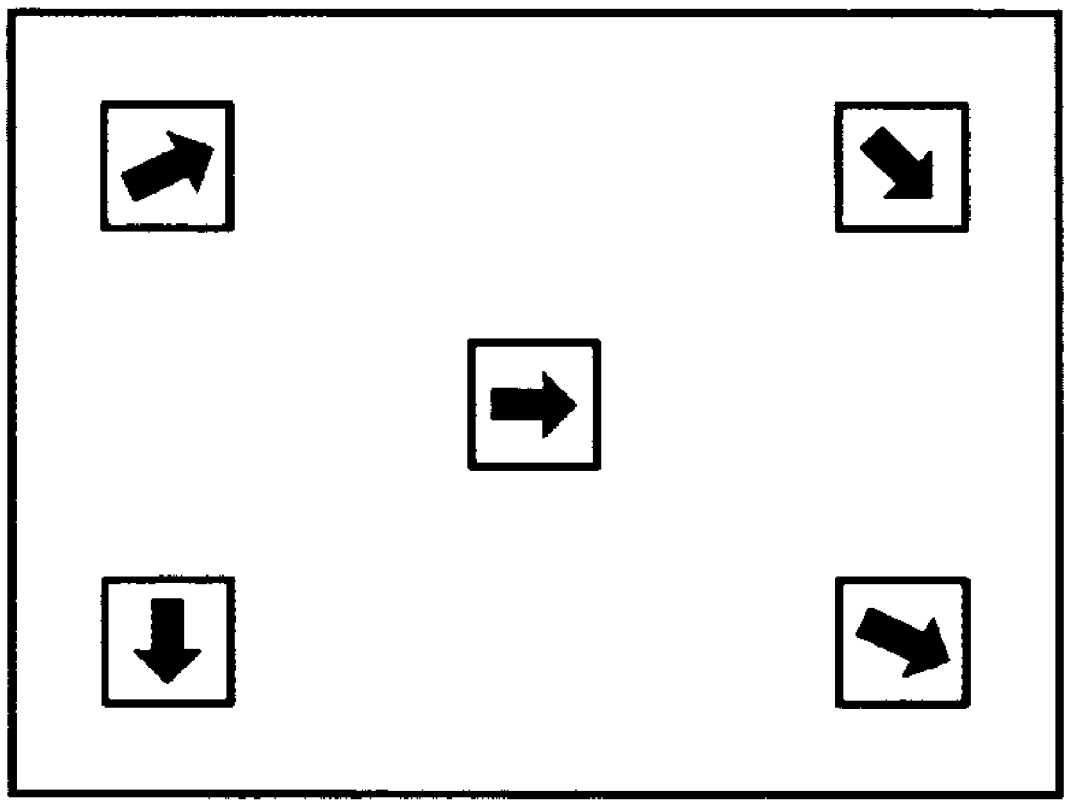
FIG. 17 is a diagram showing an example of directions of intra prediction for an ordinary image.

In this case, it can be estimated that zooming causes directions of intra prediction shown in the respective blocks in FIG. 10, while, in the case of an image shown in FIG. 17, the directions of intra prediction for the respective blocks on the picture are irregular. More specifically, in the upper left-hand block on the picture in FIG. 10, since an image flows toward the center of the picture in an oblique direction, the down-right intra prediction mode (Mode 4) is considered optimal. Similarly, in the upper right-hand block on the picture, the down-left intra prediction mode (Mode 3) is considered optimal. In the case of intra prediction in the H.264 standard, prediction samples for use in intra prediction are limited to values of adjacent blocks located above and to the left of a target block. Accordingly, in the lower left-hand block on the picture, the down-left intra prediction mode (Mode 3) is considered optimal. Similarly, in the lower right-hand block on the picture, the down-right intra prediction mode (Mode 4) is considered optimal.

Thus, the camera control unit 705 sends a control signal to the intra prediction unit 615 included in the coding unit 704 (i.e., the image coding apparatus 1400) for selecting an intra prediction mode according to the zooming action. In addition, responsive to the supplied control signal, the intra prediction unit 615 performs the following processing on an image obtained during zooming, instead of the above-described ordinary process for selecting an optimal intra prediction mode. That is, the intra prediction unit 615 uniquely selects one intra prediction mode according to the location of a target block to be coded, or selects an optimal intra prediction mode after narrowing down nine intra prediction modes to two or three intra prediction modes according to the location of the target block. By doing this, an optimal intra prediction mode can be far more efficiently selected than a case where all of the intra prediction modes are tentatively executed to select an intra prediction mode.

Figure 11:
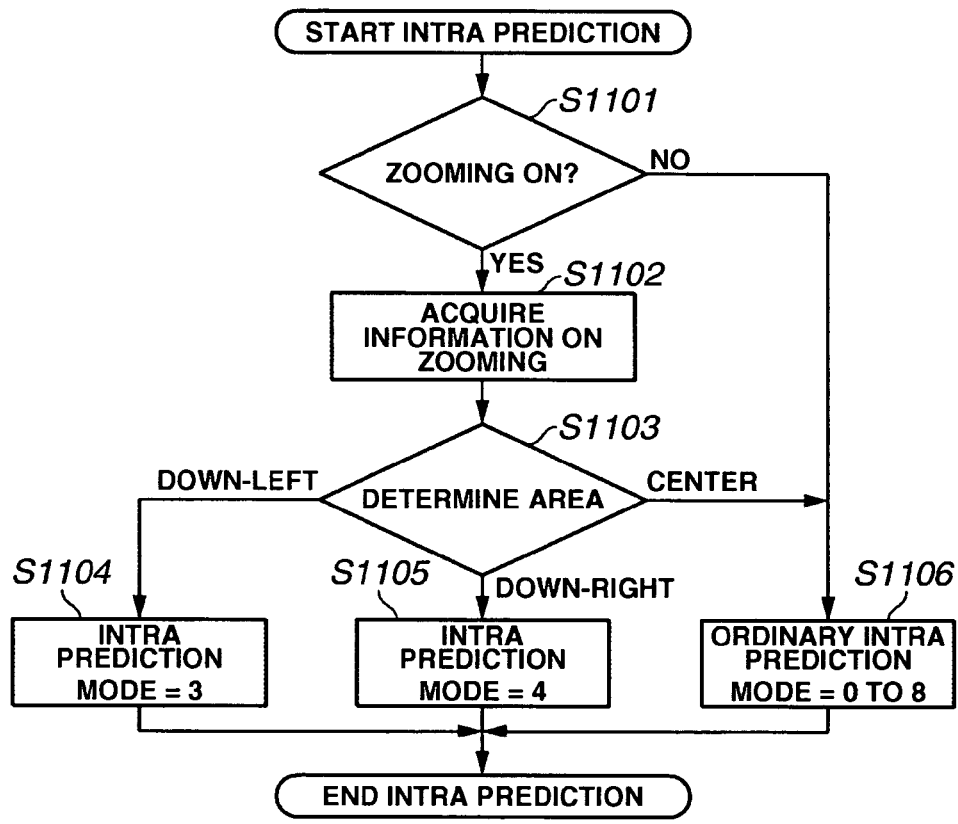
FIG. 11 is a flow chart illustrating processing for selecting an intra prediction mode according to zooming in an image coding apparatus according to a fourth embodiment of the invention.

FIG. 11 is a flow chart illustrating the operation sequence of the intra prediction unit 615 for selecting an intra prediction mode with respect to an image obtained during zooming as described above.

With respect to an image to be subjected to intra prediction, if a zooming action is not performed (or if the ultra-low speed zooming action is performed) (no in step S1101), the intra prediction unit 615 performs the ordinary process for selecting an optimal intra prediction mode as shown in FIG. 18 and performs intra prediction using the selected intra prediction mode (step S1106). On the other hand, if the zooming action is performed to move the zooming lenses 701a and 701b in response to the zooming instruction from the operation unit 710 (yes in step S1101), the intra prediction unit 615 acquires from the camera control unit 705 information indicating that zooming is in process and information on the speed of zooming (step S1102).

After acquiring information indicating that zooming is in process and information on the speed of zooming at step S1102, the intra prediction unit 615 determines an area on the picture in which a target block to be coded is located, and automatically selects a prediction direction corresponding to the determined area (step S1103). More specifically, if the target block is located in the upper left-hand area or the lower right-hand area on the picture, the intra prediction unit 615 selects the down-right intra prediction mode (Mode 4). If the target block is located in the upper right-hand area or the lower left-hand area, the intra prediction unit 615 selects the down-left intra prediction mode (Mode 3). If the target block is located in the center area or thereabound, the intra prediction unit 615 cannot specify an intra prediction mode. Therefore, the intra prediction unit 615 performs the ordinary process for selecting an optimal intra prediction mode and performs intra prediction using the selected intra prediction mode (step S1106). If the down-left intra prediction mode (Mode 3) is selected at step S1103, the intra prediction unit 615 performs intra prediction using the down-left intra prediction mode (Mode 3) (step S1104). If the down-right intra prediction mode (Mode 4) is selected at step S1103, the intra prediction unit 615 performs intra prediction using the down-right intra prediction mode (Mode 4) (step S1105).

In addition, if a picture is finely divided into areas and the obtained areas are classified, the selection of an optimal intra prediction mode can be more effectively performed. For example, if a target block is located in the area just above or just below the center of the picture, the intra prediction unit 615 selects the vertical intra prediction mode (Mode 0). If the target block is located in the area to the left or right side of the center of the picture, the intra prediction unit 615 selects the horizontal intra prediction mode (Mode 1). In addition, if a picture is more finely divided into areas to enable the other diagonal intra prediction modes (Mode 5, 6, 7, 8) to be also selected, the precision of prediction can be more improved.

In addition, in the case of the sequence shown in FIG. 11, when zooming is performed, the intra prediction unit 615 uniquely selects an intra prediction mode according to the location of a target block to be coded, except when the target block is located in the center area or thereabound. However, the intra prediction unit 615 may be configured to reduce options of intra prediction modes by narrowing down nine intra prediction modes to two or three intra prediction modes or by excluding intra prediction modes that are determined to be clearly inappropriate in prediction directions, and, after that, to obtain an optimal intra prediction mode via computation from among the remaining options.

According to the fourth embodiment as described above, information on the photographing action, such as zooming, is used for selecting an intra prediction mode. Accordingly, an optimal intra prediction mode can be easily selected and a processing load on coding can also be reduced.

Fifth Embodiment

A fifth embodiment of the invention is described below with reference to FIGS. 12 and 13.

In the fifth embodiment, when the image capture apparatus 700 described in the third embodiment performs a focusing action, the camera control unit 705 and the intra prediction unit 615 operate as follows.

In cases where the focusing action is performed during a photographing operation, the whole picture of a captured image is blurred when an in-focus state is not attained. Accordingly, when intra prediction is performed on the blurred captured image by the coding unit 704, a specific direction of prediction cannot be estimated, and the DC intra prediction mode, which uses a mean of pixel values, is considered optimal to improve the efficiency of prediction.

Figure 12:
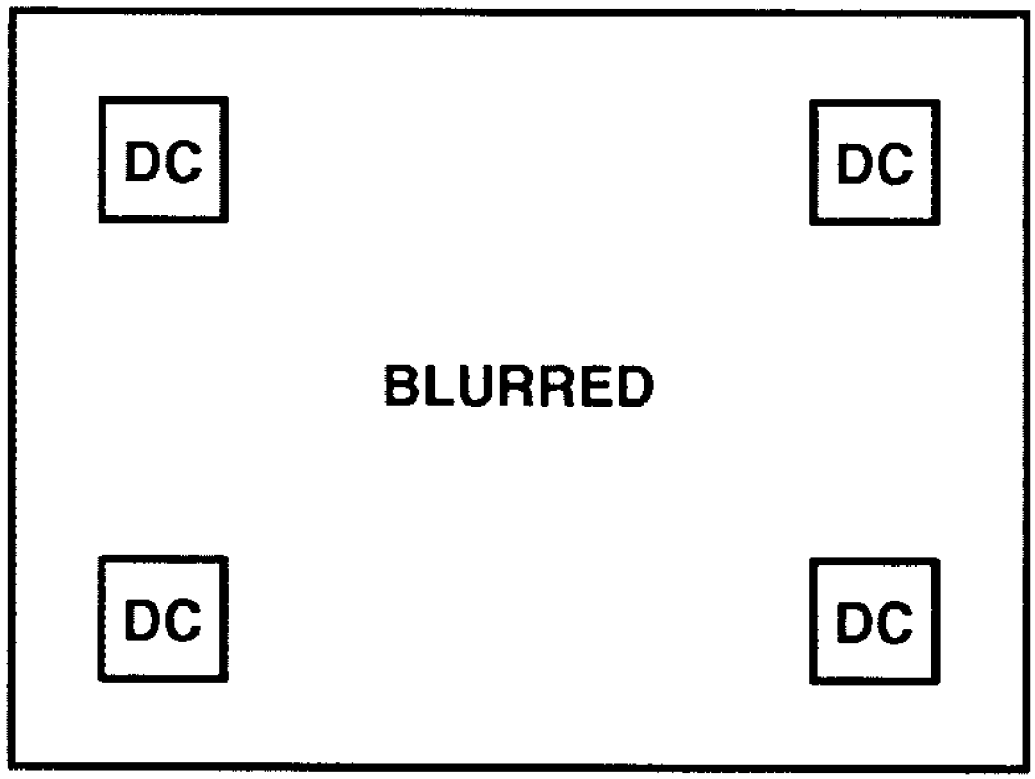
FIG. 12 is a diagram showing an example of intra prediction for a blurred image.

In this case, it can be estimated that the blurred state of the captured image causes a DC prediction condition throughout the entire picture as shown in FIG. 12, while, in the case of an image shown in FIG. 17, which is in an in-focus state, the directions of intra prediction for the respective blocks on the picture are irregular.

Thus, the camera control unit 705 sends a control signal to the intra prediction unit 615 included in the coding unit 704 (i.e., the image coding apparatus 1400) for selecting an intra prediction mode according to the focusing state. In addition, responsive to the supplied control signal, the intra prediction unit 615 uniquely selects the DC intra prediction mode for the blurred captured image, instead of performing the above-described ordinary process for selecting an optimal intra prediction mode. By doing this, an optimal intra prediction mode can be far more efficiently selected than a case where all of the intra prediction modes are tentatively executed to select an intra prediction mode.

Figure 13:
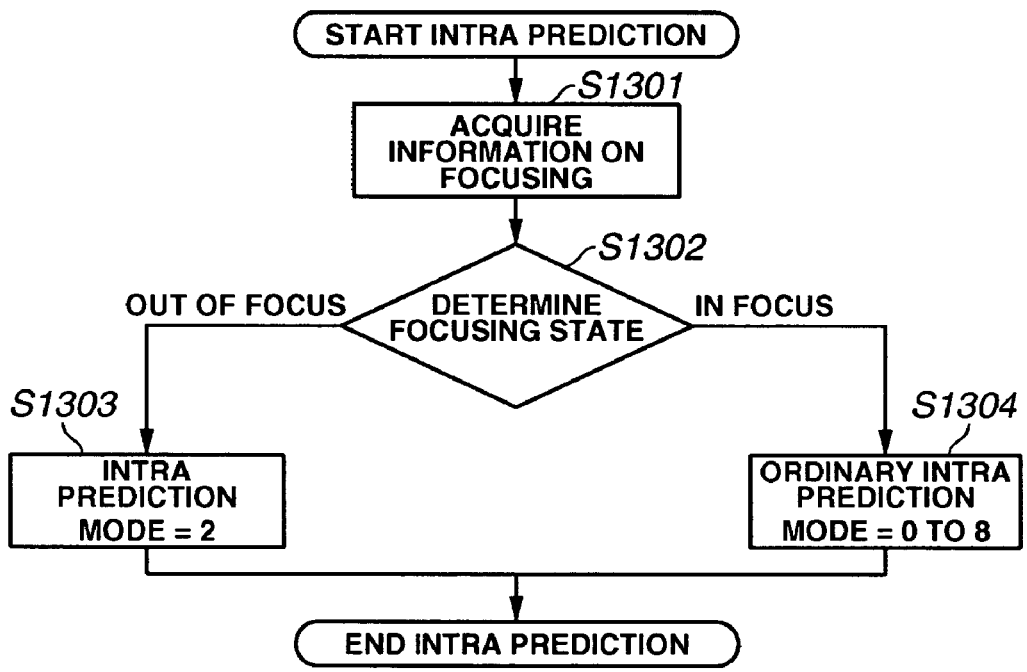
FIG. 13 is a flow chart illustrating processing for an intra prediction mode according to focusing in an image coding apparatus according to a fifth embodiment of the invention.

FIG. 13 is a flow chart illustrating the operation sequence of the intra prediction unit 615 for selecting an intra prediction mode with respect to a blurred image as described above, particularly with respect to an image captured in an out-of-focus state.

The intra prediction unit 615 acquires from the camera control unit 705 information on focusing indicating whether an image to be subjected to intra prediction has been captured in an in-focus state or an out-of-focus state (step S1301). If, in step S1302, it is determined from the information on focusing that the image has been captured in an in-focus state, the intra prediction unit 615 performs the ordinary process for selecting an optimal intra prediction mode as shown in FIG. 18 and performs intra prediction using the selected intra prediction mode (step S1304).

If, in step S1302, it is determined from the information on focusing that the image has been captured in an out-of-focus state, i.e., the image is blurred, the intra prediction unit 615 automatically selects the DC intra prediction mode and performs intra prediction using the DC intra prediction mode (Mode 2) (step S1303).

According to the fifth embodiment as described above, information on the photographing action, such as focusing, is used for selecting an intra prediction mode. Accordingly, an optimal intra prediction mode can be easily selected and a processing load on coding can also be reduced.

The operation sequences described in the third to fifth embodiments may be performed independently or may be performed in combination. If those operation sequences are performed in combination, an optimal intra prediction mode can be efficiently selected in response to various photographing conditions and a processing load on coding can also be reduced.

Each embodiment can also be achieved by providing a system or apparatus with a storage medium that stores program code (software) for implementing the functions of the above-described embodiments, and causing a computer (or a CPU (central processing unit), MPU (micro processing unit) or the like) of the system or apparatus to read the program code from the storage medium and then to execute the program code. In this case, the program code itself read from the storage medium implements the functions of the embodiments. Furthermore, besides the program code read by the computer being executed to implement the functions of the above-described embodiments, the present invention includes an operating system (OS) or the like running on the computer performing an actual process in whole or in part according to instructions of the program code to implement the functions of the above-described embodiments. Examples of the storage medium storing the program code include a floppy disk, a hard disk, a ROM (read-only memory), a RAM (random access memory), a magnetic tape, a non-volatile memory card, a CD-ROM (compact disc-read-only memory), a CD-R (compact disc-recordable), a DVD (digital versatile disc), a Blu-ray disc, an optical disk, an MO (magneto-optical disk), etc.

Moreover, the present invention also includes a CPU or the like contained in a function expansion board inserted into the computer or in a function expansion unit connected to the computer, the function expansion board or the function expansion unit having a memory in which the program code read from the storage medium is written, the CPU or the like performing an actual process in whole or in part according to instructions of the program code to implement the functions of the above-described embodiments.

If the present invention is applied to the above storage medium, a program code corresponding to the above-described flow charts is stored in the storage medium.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Applications No. 2004-179933 filed Jun. 17, 2004 and No. 2005-026530 filed Feb. 2, 2005, which are hereby incorporated by reference herein.

What is claimed is:

1. An image coding apparatus comprising:
    an input unit configured to input image data to be coded, wherein the image data is generated by an image capture apparatus;
    an acquisition unit configured to acquire photographing information indicating a zoom operating condition in which an image corresponding to the image data has been captured by the image capture apparatus;
    an intra prediction unit which performs an intra prediction corresponding to n prediction directions of which each of the prediction directions of pixels is different; and
    a selection unit configured to select a predetermined prediction direction from among the n prediction directions to perform the intra prediction according to a location of an image block corresponding to the image data to be coded in a case that the photographing information indicates that zooming is on.

2. An image coding apparatus according to claim 1, wherein the image capture apparatus comprises:
    a photographing unit configured to supply the input unit with the image data obtained by performing the photographing operation; and
    a photographing information generating unit configured to generate the photographing information concurrently with the photographing operation performed by the photographing unit and to supply the photographing information to the acquisition unit.

3. An image coding apparatus according to claim 2, wherein the photographing information generating unit is configured to generate the photographing information based on information for controlling a zooming action in the photographing unit, and, based on the photographing information, the selection unit is configured to select the predetermined prediction direction when the image data represents an image captured during the zooming action.

4. An image coding method performed by an image coding apparatus, the method comprising steps of:
    inputting image data to be coded, wherein the image data is generated by an image capture apparatus;
    acquiring photographing information indicating a zoom operating condition in which an image corresponding to the image data has been captured by the image capture apparatus;
    performing an intra prediction corresponding to n prediction directions of which each of the prediction directions of pixels is different; and
    selecting a predetermined prediction direction from among the n prediction directions to perform the intra prediction according to a location of an image block corresponding to the image data to be coded in a case that the photographing information indicates that zooming is on.

5. An image coding apparatus according to claim 1, wherein the selection unit is configured to select a direction to a center of a picture or a direction opposite to the direction to the center of the picture as the predetermined prediction direction according to the location of the image block corresponding to the image data to be coded.

6. An image coding apparatus according to claim 1, wherein the selection unit is configured to divide a picture into a plurality of areas and to select the prediction direction in which the same prediction direction is applied within each area.

7. An image cording apparatus according to claim 1, wherein the selection unit is configured to select a prediction direction by a process different between in a case that the photographing information indicates that zooming is in process and in a case that the photographing information does not indicate that zooming is in process.

* * * * *